Sept. 20, 1971 O. R. READ 3,605,378

TAPE LOADING APPARATUS

Filed March 16, 1970 9 Sheets-Sheet 1

INVENTOR
OWEN RODWELL READ
BY

ATTORNEY

INVENTOR
OWEN RODWELL READ
BY William Frederick Warner
ATTORNEY

INVENTOR
OWEN RODWELL READ
BY William Frederick Ikarner
ATTORNEY

INVENTOR
OWEN RODWELL READ
BY
William Frederick Werner
ATTORNEY

Sept. 20, 1971 O. R. READ 3,605,378

TAPE LOADING APPARATUS

Filed March 16, 1970 9 Sheets-Sheet 5

INVENTOR

OWEN RODWELL READ

BY

William Frederick Werner

ATTORNEY

Sept. 20, 1971 O. R. READ 3,605,378

TAPE LOADING APPARATUS

Filed March 16, 1970 9 Sheets-Sheet 6

INVENTOR
OWEN RODWELL READ

BY
William Frederick Werner
ATTORNEY

Sept. 20, 1971 O. R. READ 3,605,378
TAPE LOADING APPARATUS
Filed March 16, 1970 9 Sheets-Sheet 7

INVENTOR
OWEN RODWELL READ
BY William Frederick Werner
ATTORNEY

INVENTOR
OWEN RODWELL READ
BY William Frederick Werner
ATTORNEY

INVENTOR
OWEN RODWELL READ
BY William Frederick Werner
ATTORNEY

United States Patent Office 3,605,378
Patented Sept. 20, 1971

3,605,378

TAPE LOADING APPARATUS

Owen Rodwell Read, 71 Orchard Drive, Cumberland, R.I. 02864

Continuation-in-part of application Ser. No. 809,504, Mar. 24, 1969. This application Mar. 16, 1970, Ser. No. 19,940
Int. Cl. B65b *63/04*
U.S. Cl. 53—116 7 Claims

ABSTRACT OF THE DISCLOSURE

This specification discloses apparatus for loading tape into one or more boxes, simultaneously, through the open top thereof to achieve an orderly arrangement of the stored tape. The apparatus comprises a horizontal platform on which a box or boxes are received, a tape guide chute or chutes fastened to a rod, mechanism for oscillating the rod and chutes laterally above the boxes and independent mechanism for traversing the rod and chutes longitudinally of the boxes.

The present invention is a continuation-in-part of United States application Ser. No. 809,504 filed Mar. 24, 1969.

The present invention relates to apparatus for loading tape into a box or container through the open top thereof and is concerned primarily with mechanism for laying the tape in the container in an orderly arrangement through lateral and longitudinal movement of the tape laying mechanism.

In the past, narrow fabric or tape was wound upon a spool for purposes of storage and transportation as the tape "came off" the narrow fabric loom.

The spool usually weighed two and one half pounds and two and one half pounds of tape was usually found upon the spool.

In transporting the tape from the mill where the tape was woven to the factory where the tape was sewn into garments, such as the elastic band in men's shorts, a freight charge was made for transporting a two and one half pound spool in two directions in order to deliver two and one half pounds of tape in one direction.

The problem presented was the development of mechanism which would supply the tape at uniform tension and in a smooth and even manner to a sewing machine, and at the same time eliminate the need for a support core or spool for the tape. The present invention relates to such mechanism.

It is an object of the present invention to provide apparatus which will lay tape in a container in such a manner, so as to permit the tape to be withdrawn from the container in a smooth and even manner and under uniform tension.

It is another object of the present invention to provide apparatus which will store tape in a box unsupported by a core in a manner to prevent entanglement of the tape in transportation.

It is a further object of the present invention to lay tape in a box by means of a combined "cross-over" movement consisting of an oscillating lateral movement and transverse or longitudinal feed motion.

And still another object of the present invention is to tamp the loop ends of the layer tape to remove the "eye"

formed in the tape as the tape is folded upon itself.

Other objects of the present invention will become apparent in part and be pointed out in part in the following specification and claims.

Like reference characters refer to like parts in the following drawings, in which.

Figure 1:
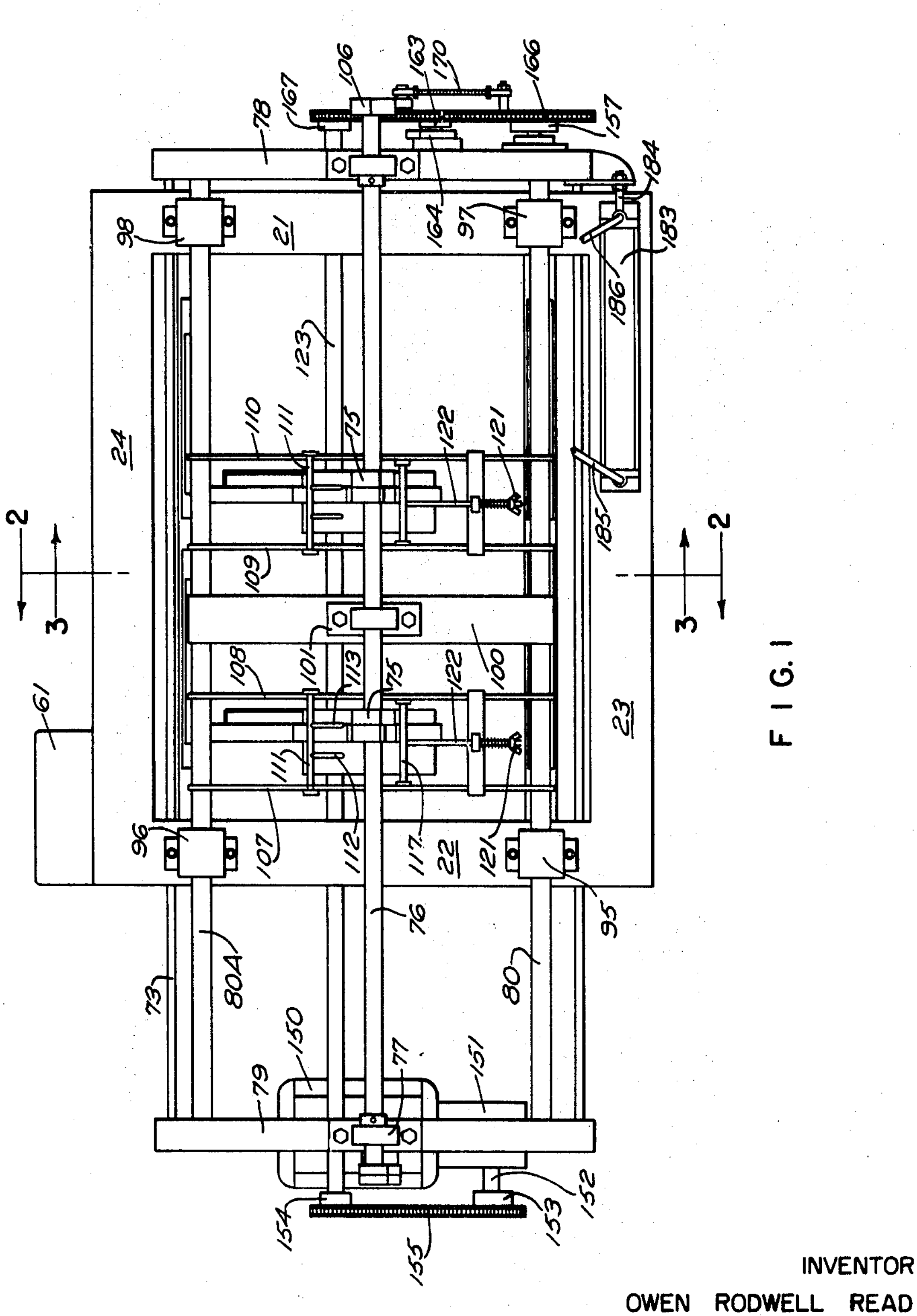
FIG. 1 is a plan view of the new and improved tape loading apparatus.

The framework is identified in its entirety at F. It is shown in FIGS. 1, 2, 3, 5, 6, 7 and 8, as comprising side struts 13, 14 and end struts 15, 16 all of inverted channel formation and fastened at the respective ends, as by welding, so as to define a rectangular shaped pedestal.

Upstanding from the corner of this pedestal are four uprights 17, 18, 19 and 20 (FIGS. 2, 3, 6, 7 and 8).

Extending between the uprights 17 and 20 at their upper ends is a top end strut 21. Similarly, another top end strut 22 extends between uprights 18 and 19. Top side struts 23 and 24 extend between the upper ends of the four uprights 19, 20, and 17, 18, respectively. The top end struts 21, 22 and top side struts 23, 24 form a rectangle which overlies the rectangularly shaped pedestal.

Figure 2:
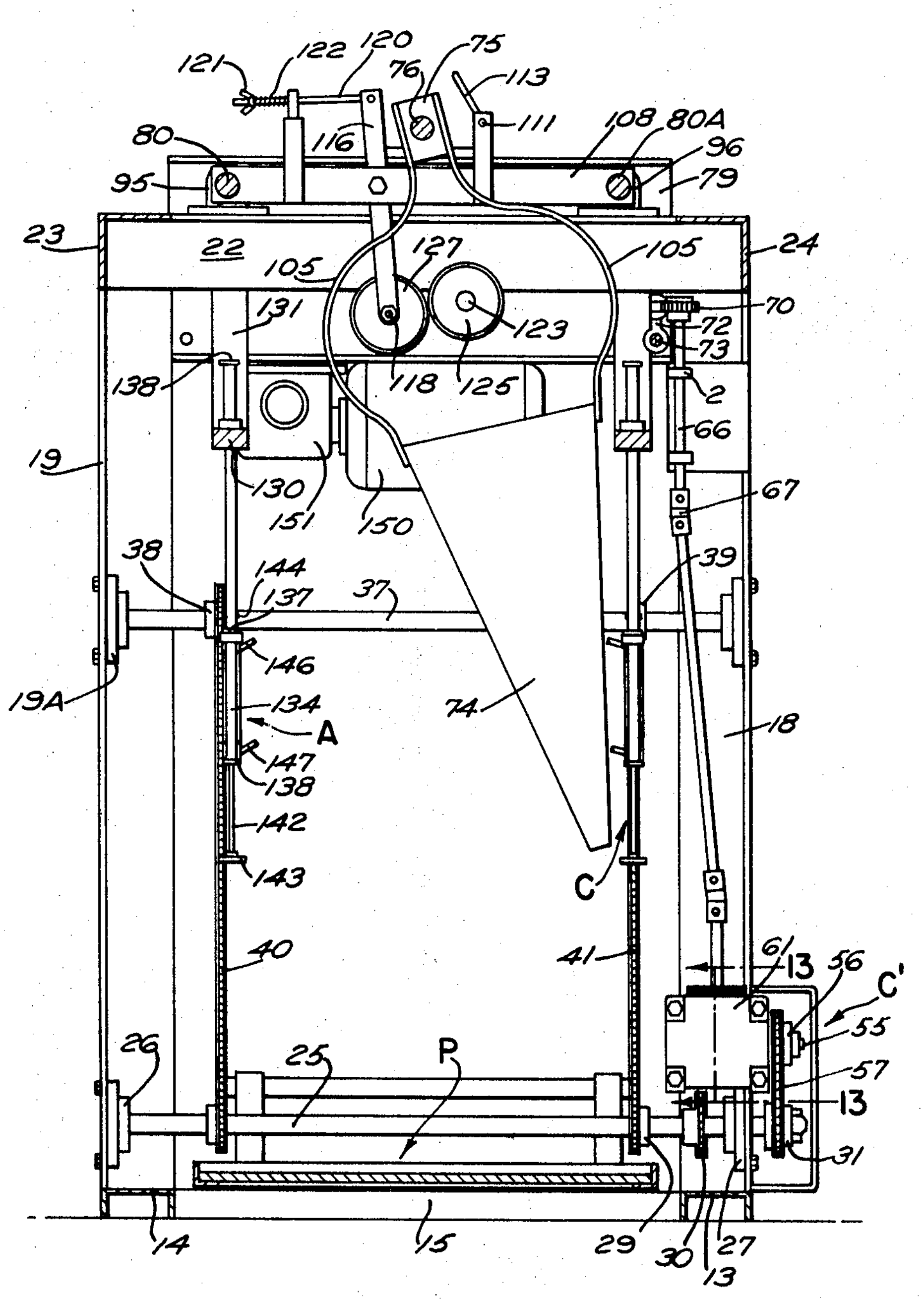
FIG. 2 is a vertical cross sectional view taken on line 2—2 of FIG. 1, looking in the direction of the arrows.
Figure 3:
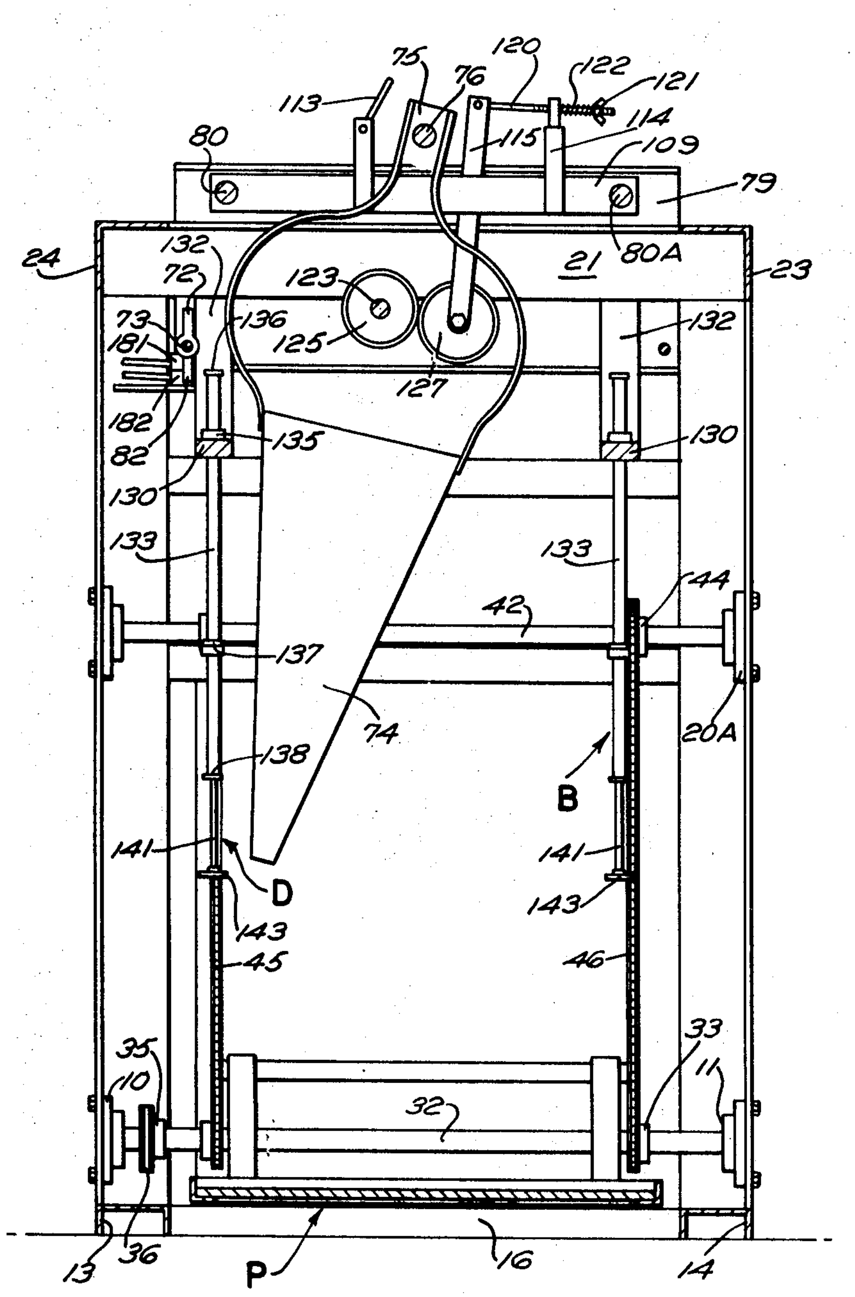
FIG. 3 is a view similar to FIG. 2 and is taken on the same plane as FIG. 2 but views the apparatus in an opposite direction, as shown by the arrows.

Still referring mainly to FIGS. 2 and 3, a lower shaft 25 has its ends journalled in uprights 19 and 18, as indicated at 26 and 27 in FIG. 2. Shaft 25 drivaby carries four sprockets 28, 29, 30 and 31.

Referring to FIG. 3, a second lower shaft 32 has its ends journalled in uprights 17 and 20, as indicated at 10 and 11. Shaft 32 drivably carries sprocket gears 33, 34 and 35. An endless chain 36, which is more clearly shown in FIGS. 3 and 6 passes over sprockets 31 and 35 to drive shaft 32 from shaft 25.

An upper shaft 37 (FIG. 2) has its ends anchored to uprights 18 and 19, (as indicated at 18A and 19A) and rotatable thereon are idler sprockets 38 and 39. An endless chain 40 passes over sprockets 28 and 38 while another chain 41 passes over sprockets 29 and 39. Movement of these chains is controlled or caused by drive shaft 25.

Referring to FIG. 3, a second upper shaft 42 has its ends anchored to uprights 17 and 20, as indicated at 17A and 20A. Rotatable on shaft 42 are idler sprockets 43 and 44. An endless chain 45 passes over sprockets 34 and 43 while another chain 46 passes over sprockets 33 and 44. Travel of these chains is controlled by shaft 32 which is in turn driven by drive shaft 25.

Figures 10, 11, 13:
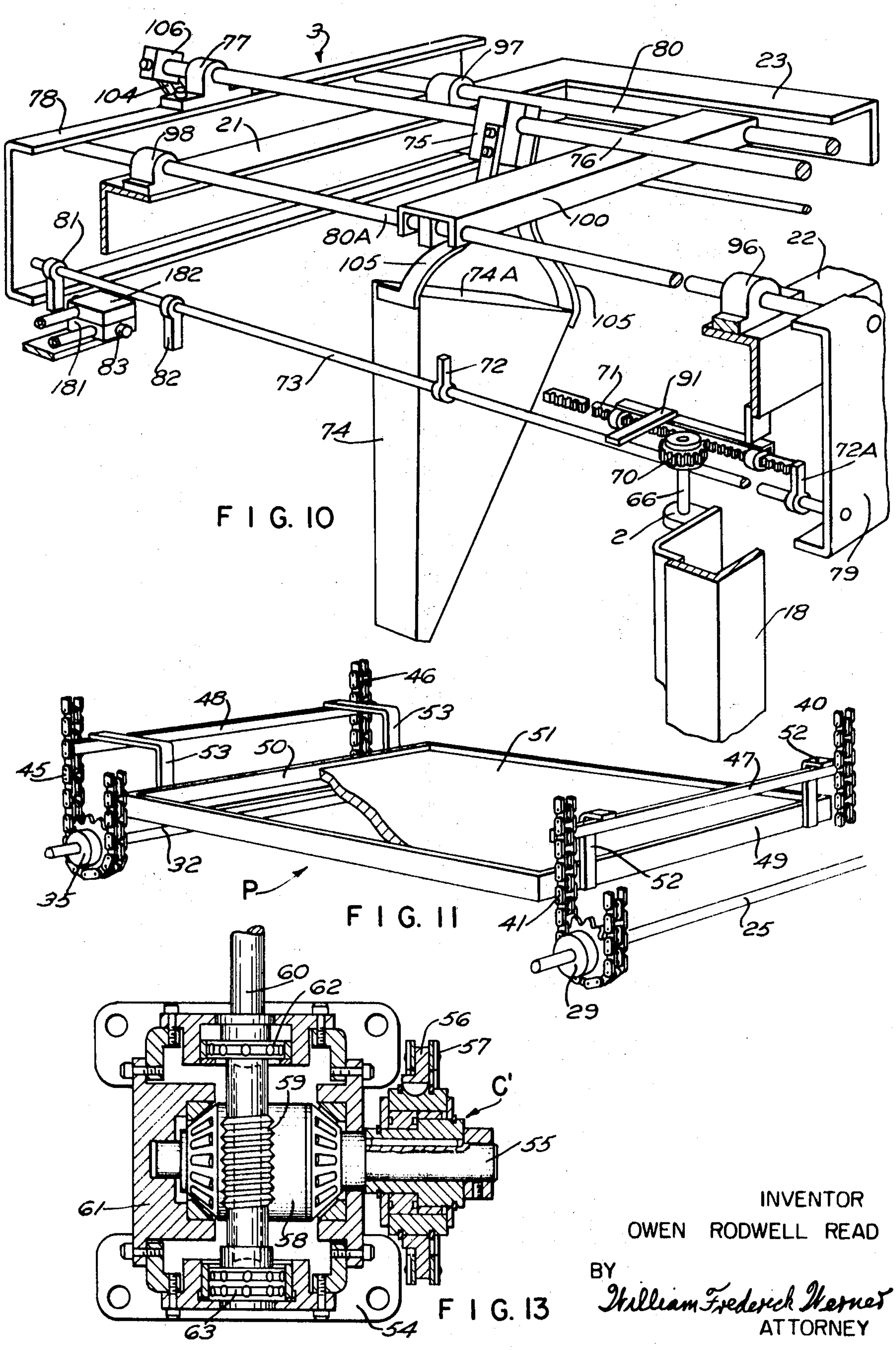
FIG. 10 is a fragmentary perspective view, similar to FIG. 8, with the framework broken away, as viewed from the rear left corner of FIG. 1.
FIG. 11 is a detailed perspective view of the platform and its mounting on the endless chains.
FIG. 13 is a vertical section on an enlarged scale through the worm, worm wheel and overriding clutch, taken on the plane represented by the line 13—13 of FIG. 2.

Referring to FIG. 11, a cross bar 47 has its ends secured to the inner plies of chains 40 and 41 while another cross bar 48 has its ends secured to the outer plies of chains 45 and 46. A platform is identified in its entirety at P. It comprises a rectangularly shaped skeleton including end members 49 and 50. Received in this skeleton is a floor 51. Carried by end member 49 are a pair of suspension brackets 52, the upper ends of which are turned outwardly and fastened to bar 47. Similarly, a pair of brackets 53 are carried by end member 50 and have out turned end portions which fasten to bar 48. Thus, the platform P is supported by bars 48 and 47 which are in turn secured to the chains.

Figures 6, 12:
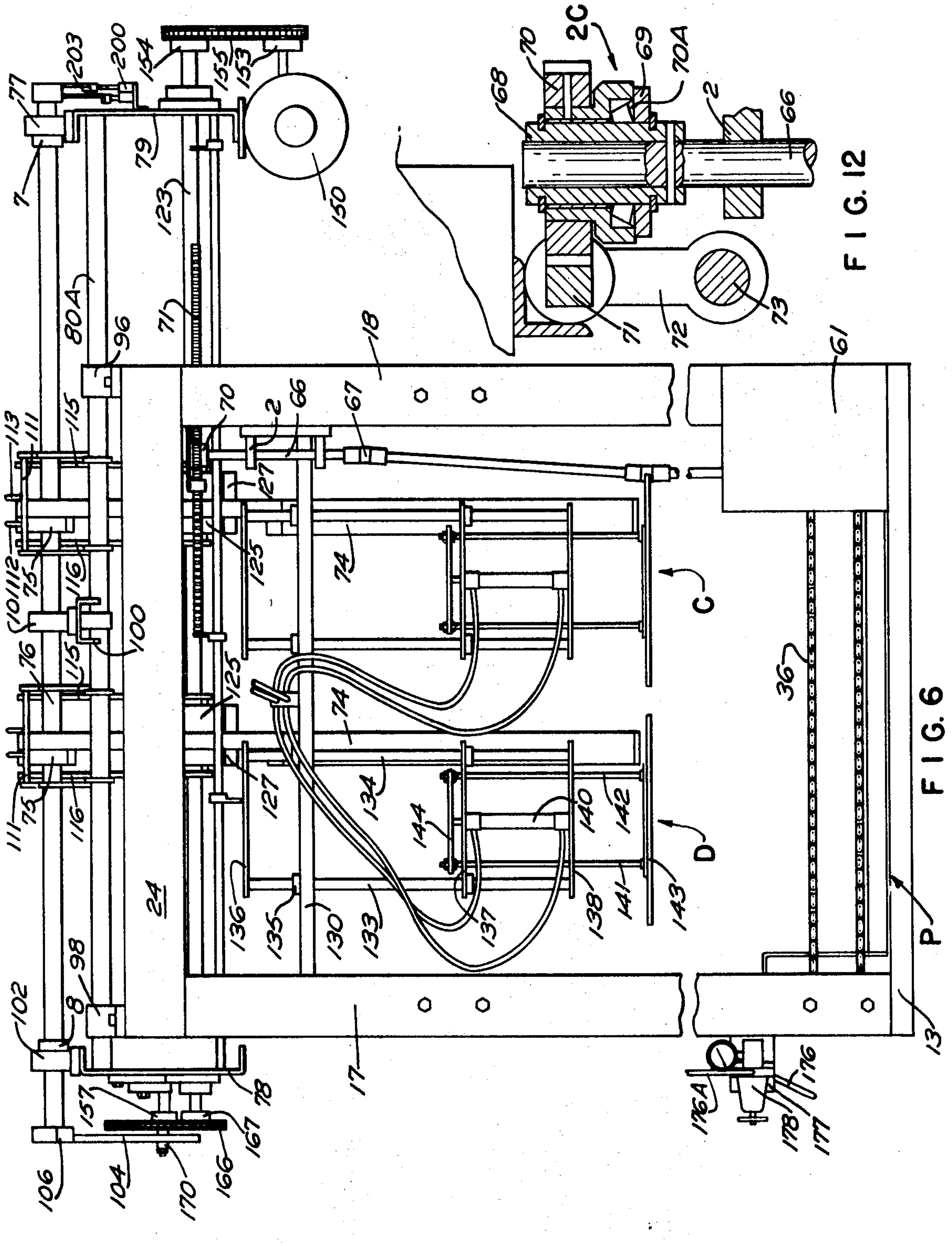
FIG. 6 is a rear elevational view.
FIG. 12 is a sectional detail on an enlarged scale through the upper portion of the drive shaft, overriding clutch and actuating rod.

Reference is directed to FIGS. 1, 2 and 6. A casing 61 fastened to the lower end of upright 18 houses a drive shaft section 60 journalled in bearings 62 and 63 mounted in the top and bottom of casing 61. A stub shaft 55 is journalled in the walls of casing 61 in a well known manner, as illustrated. A worm 59 is drivably carried at the lower end of drive shaft section 60. A worm wheel 58 is drivably carried on one end of stub shaft 55 for operative engagement with worm 59. A (first) overriding clutch, generally indicated by reference character C, is operatively connected to the other end of stub shaft 55. The overriding clutch includes a sprocket 56. A chain 57 passes over the sprocket 56 and sprocket 31 on drive shaft 25.

It is evident that engagement of the worm 59 with the worm wheel 58 holds stub shaft 55 against rotation. However, when shaft section 60 is rotated, stub shaft 55 is positively driven, overriding clutch C is also in positive drive condition and is positively driven so as to rotate drive shaft 25 and lower platform P. The overriding clutch C permits platform P to be moved upwardly to starting position for downward movement when stub shaft 55 is positively driven.

Shaft section 60 is drivably connected to an intermediate shaft section 64 by a flexible coupling 65. The other end of section 64 is connected to an upper shaft section 66 by a flexible coupling 67.

Pillow blocks 95 and 96 are fastened to top end strut 22. Pillow blocks 97, 98 are fastened to top end strut 21. Slide rod 80 is slidably mounted in pillow blocks 95, 97. Slide rod 80A is slidably mounted in pillow blocks 96, 98. A panel 78 is fastened to the end of slide rods 80, 80A. A second panel 79 is fastened to the opposite ends of slide rods 80, 80A to form a reciprocating carriage generally indicated at 3.

Figure 8:
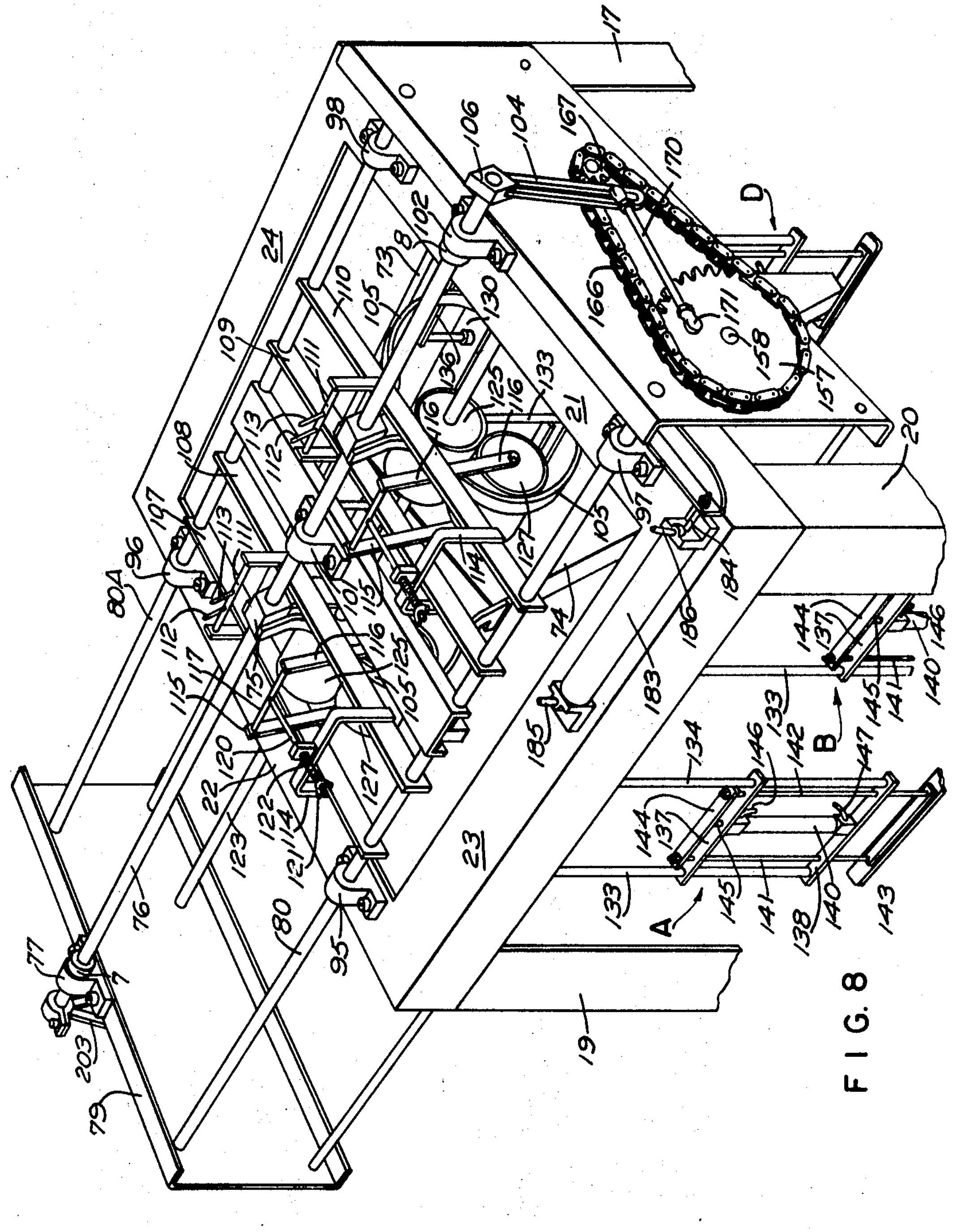
FIG. 8 is a fragmentary perspective view showing the reciprocating carriage supported upon the top of the framework, as viewed from the front right hand corner of FIG. 1.

A rod 73 provided with fingers 81, 82 and actuator arms 72, 72A is fastened on opposite ends to panel 78 and second panel 79 so as to become a part of reciprocating carriage 3 (FIGS. 8 and 10). A rack 71 is slidably supported in a bracket 90 fastened to top end strut 22 and by means of arm 91 to top side strut 23.

With continued reference to FIG. 2 and additionally to FIGS. 6, 10, and 12, shaft section 66 drivably carries a sleeve 68 which is journalled in a tab 69 that outstands from upright 18. A pinion 70 is drivably connected to sleeve 68 by means of sprags located in chamber 70A to thereby provide an overriding clutch 2C. Pinion 70 meshes with a rack 71 which is moved linerally by actuator arms 72, 72A which upstand from a rod 73 and are adjustably fastened to rod 73. A bracket 2 outstands from upright 18 and rotatively supports upper shaft section 66. Hereinafter the mechanism just described will be referred to as a sixth means operatively connecting said reciprocating carriage with said platform.

Rack 71 is in operative engagement with pinion 70. Actuator arms 72, 72A engage opposite ends of rack 71 to reciprocate rack 71 and pinion 70 to rotate shaft section 66 to thereby lower platform P. The function of fingers 81, 82 will hereinafter appear.

A brace 100 is fastened upon opposite ends to slide rods 80, 80A, respectively, Pillow blocks 77, 101 and 102 are fastened, respectively, to second panel 79, brace 100 and panel 78. A shaft 76 is mounted for oscillating or rotating movement in pillow blocks 77, 101 and 102 and is fixed in said pillow blocks by means of collars 7 and 8 so as to reciprocate with reciprocating carriage 3.

Referring to FIGS. 1, 2, 3, 8 and 10 there is illustrated a tape guide means consisting of a hollow tapered chute 74 having a wide open end 74A and a very narrow or spout end 74B. A two part block 75 is fastened to shaft 76. Brackets 105 are fastened on one end to hollow chute 74 and on the other end to two part block 75, so that oscillation of shaft 76 oscillates hollow chute 74. One or more hollow chutes 74 may be fastened to shaft 76. Two such hollow chutes 74 are illustrated in FIG. 8.

Figure 5:
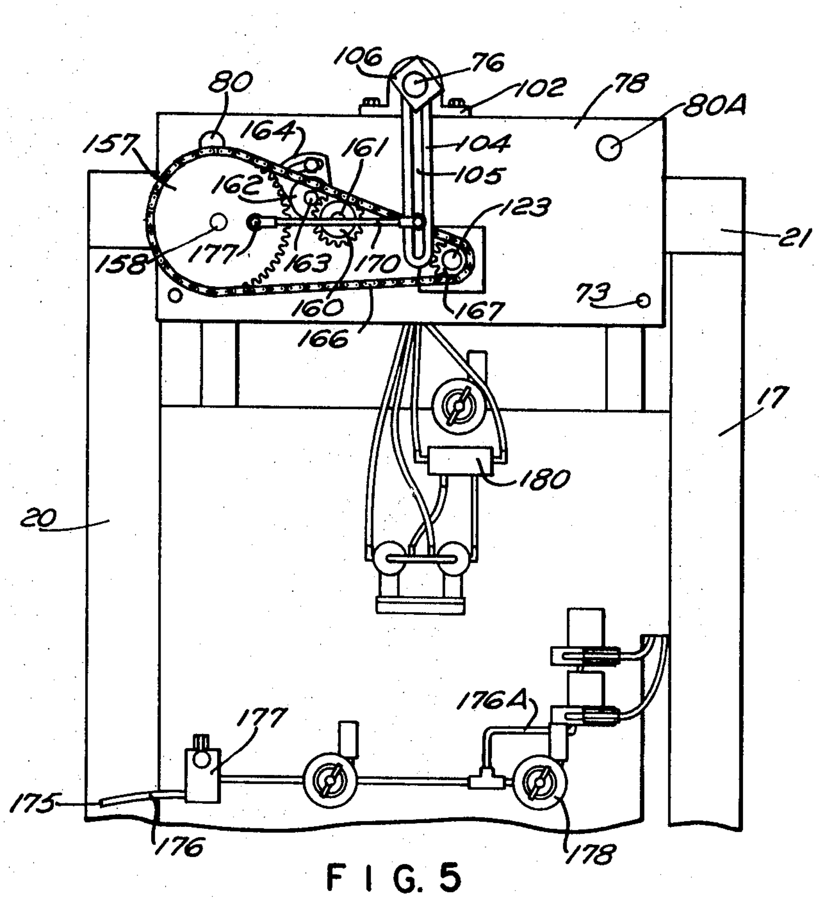
FIG. 5 is a right hand end view of the apparatus shown in FIG. 1.

Referring to FIGS. 1, 5 and 8, a link 104 provided with an elongated slot 105 and an integrally connected holding block 106, is fastened to one end of shaft 76 by means of holding block 106, for purposes which will presently appear.

Four straps 107, 108, 109 and 110 are fastened on opposite ends, respectively, to slide rods 80, 80A. A U-shaped bracket 114 provided with a cap 115 is fastened on opposite ends to straps 107, 108. A second U-shaped bracket having a cross bar 111 is fastened on opposite ends to straps 107, 108. Two guide fingers 112, 113 are fastened to cross bar 111. A pressure roll bracket consisting of side arms 115, 116 pivotally mounted respectively, to straps 107, 108 is provided with a crod 117 and a roll shaft 118 fastened in side arms 115, 116. A pincer roll 127 is mounted for free rotation upon roll shaft 118. A tension rod 120 fastened on one end to cross rod 117 is slidably mounted in cap 115 and is provided with a wing nut 121 rotatively mounted upon screw threads located on tension rod 120 for that purpose. A coil spring 122 is interposed between wing nut 121 and cap 115. A main drive shaft 123 is rotatively mounted on opposite ends in panels 78 and 79. A feed roller 125, is fastened to main drive shaft 123 to rotate therewith. Coil spring 122 through tension rod 120 yieldingly urges pincer roll 127 against feed roller 125. Tape (not shown) passes from a source of tape supply (not shown) between guide fingers 112, 113 to pass between pincer roll 127 and feed roller 125. Rotating feed roller 125 will draw the tape into wide open end 74A of hollow chute 74. The tape will pass through hollow chute 74 and spout end 74B into a corrugated box (not shown) in a manner, presently to be described.

Similarly, straps 109, 110 are provided with a U-shaped bracket 114, a second U-shaped bracket having a cross bar 111, a pincer roll bracket having side arms 115, 116. a pincer roll 127 and a feed roller 125, as previously stated for straps 107, 108. Each two straps such as 107, 108 and the mechanism associated therewith, as described, supra, constitutes a station. FIG. 8 illustrates two stations. By increasing the length of top struts 23, 24 and slide rods 80, 80A and shaft 76 and other associated mechanisms, the present tape loading mechanism may encompass ten or more stations.

Referring to FIGS. 2, 3, 6, 7 and 8, there is illustrated a tamping mechanism generally indicated by the letter A. A bracket 130 is provided with arms 131 and 132 which are fastened, respectively, to top end struts 22 and 23. Two rods 133, and 134 are adjustably fastened in bracket 130 by means of nuts 135. A cross arm 136 is fastened to the upper ends of rods 133 and 134. An upper platform 137 and a lower platform 138 are fastened in spaced relation upon rods 133 and 134. A two way air cylinder 140 is fastened between platforms 137, 138. Two rods 141, 142 are mounted for reciprocating movement in platforms 137, 138. A tamping base 143 is fastened to the lower ends of rods 141, 142. A stiffening bracket 144 is fastened to the other ends of rods 141, 142. Upper platform 137 is provided with a clearance orifice to accommodate piston rod 145 of air cylinder 140. Air is supplied to opposite sides of the piston head (not shown) fastened to piston rod 145, by conduits 146 and 147 to thereby reciprocate tamping base 143.

Similarly, a second tamping mechanism is generally indicated by the letter B, and a third and a fourth tamping mechanism is generally indicated, respectively, by the letters C and D (FIG. 6).

Tamping mechanisms A and C would normally tamp the tape layed in one box or carton by thread guide or chute 74. Similarly, tamping mechanisms B and D would normally tamp the tape layed in another carton by another chute 74, if the apparatus is provided with two stations as illustrated, herein.

Figure 4:
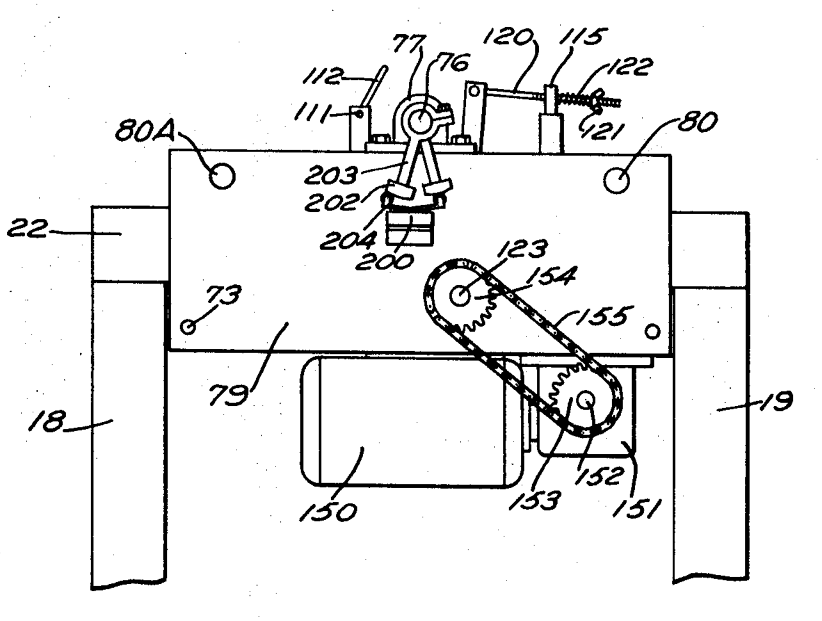
FIG. 4 is a view looking at the upper left hand end of the apparatus shown in FIG. 1, and illustrates the motor drive.

Referring to FIGS. 1, 2, 3, 4, 5, 6, 7, 8, 10; and especially FIG. 4; an electric motor 150 operatively connected to a gear reducer shaft 151 is fastened to movable frame 79. Gear reducer shaft 152 driven by electric motor 150 is provided with a drive sprocket 153. A driven sprocket 154 is fastened to the end of main drive shaft 123. A chain 155 operatively connects drive sprocket 153 with driven sprocket 154.

Special reference is made to FIG. 5, wherein a crank sprocket wheel 157 is mounted for free rotation upon a stub shaft 158 fastened in movable frame 78. An idler tensioning pulley 160 is mounted upon a shaft 161 fixed in an arm 162 pivotally connected at 163 to an adjustable bracket 164 fastened to movable frame 78. A drive sprocket 167 is fastened to main drive shaft 123. A chain 166 operatively connects drive sprocket 167 with crank sprocket wheel 157 and idler tensioning pulley 160. A crank arm 170 is pivotally connected at 171 to crank sprocket wheel 157 and is slidably fastened in elongated slot 105, whereby motor 150 rotating shaft 152, rotates main drive shaft 123 with rollers 125 thereon, and rotates crank sprocket wheel 157 thereby moving crank arm 170 to reciprocate link 104 and shaft 76. Chutes 74 being fastened to shaft 76, through split blocks 75, are reciprocated therewith.

Figure 9:
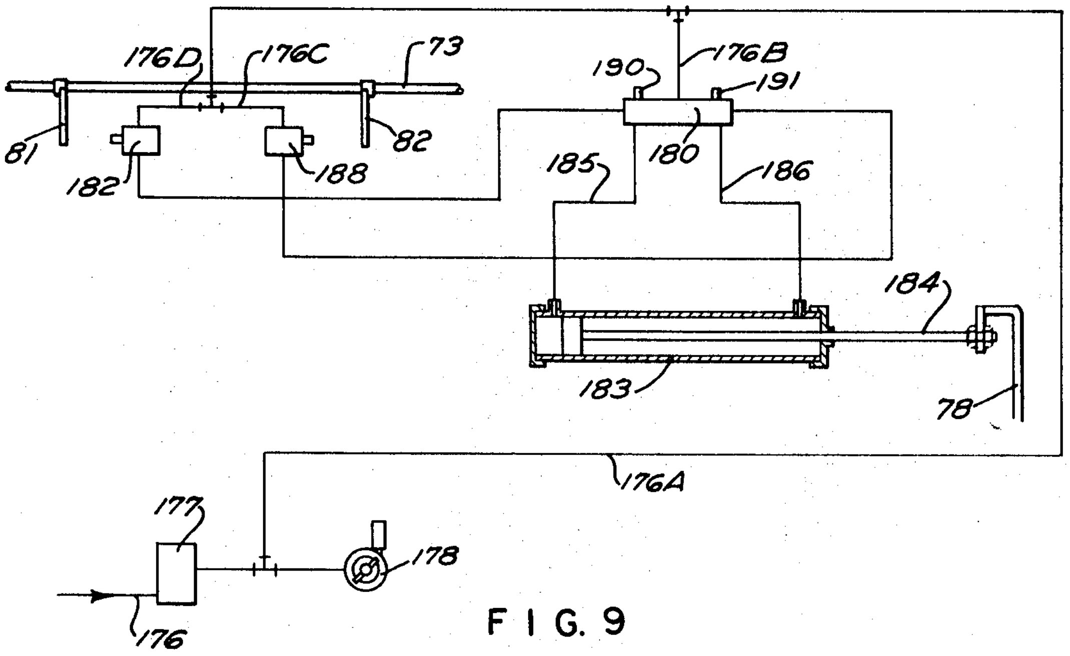
FIG. 9 is a diagrammatic view of the pneumatic transverse operating mechanism.

Reference is now made to FIGS. 1, 8, 9, 10 and especially to FIG. 9, the diagrammatic view of the pneumatic transverse operating mechanism.

A source of air supply is provided at the entrance 175 of air conduit 176. An "on-off" or shut-off valve 177 is placed in conduit 176. A pressure regulator valve 178 is also placed in conduit 176 for purposes presently to appear. Air passes through conduit 176A to (1) a four way double actuator valve 180 through conduit 176B and to (2) normally closed control valve 181 through conduit 176C and to (3) normally closed control valve 182 through conduit 176D. Control valves 181, 182 are fastened to the framework F, and are aligned with rod 73.

A reciprocating working double action air cylinder 183 provided with a piston head (not shown) attached to piston rod 184, is fastened to top side strut 23. Piston rod 184 is fastened to movable frame 72.

Conduits 185 and 186 operatively connect four way double actuator valve 180 with opposite sides of the piston head in reciprocating working double acting air cylinder 183. Conduit 187 operatively connects control valve 182 with four way double actuator valve 180. Conduit 188 operatively connects control valve 181 with four way double actuator valve 180 which is provided with two exhaust ports at 190 and 191.

Control valve 181 is provided with a valve operating member 83 and control valve 182 is provided with a valve operating member 83A. Fingers 81, 82 carried by rod 73 engage valve operating members 83A, 83, respectively.

In operation, air shut-off valve 177 is turned to allow air to pass through conduits 176, 176A, 176B to four way double actuator valve 180 and through conduits 176C, 176D to normally closed control valves 181, 182, respectively.

Four way double actuator valve 180 will allow air to pass through conduit 185 or 186 depending upon the position of the air control spool in valve 180. Air passing through conduit 186 will move piston rod 184 in the direction of arrow 5 (FIG. 9) to thereby shift movable frame 78 in a direction as seen in FIGS. 9 and 10 whereby finger 82 engages valve operating member 83, which allows air from conduit 176C to pass through control valve 181 to and through conduit 188 to four way double actuator valve 180 where air is shut-off to conduit 186 and sent through conduit 185 to move piston rod in a direction opposite to the direction of arrow 5, to thereby shift movable frame 78 in an opposite direction, whereby finger 81 engages valve operating member 83A which allows air from conduit 176D to pass through control valve 182 to and through conduit 187 to four way double actuator valve 180 where air is shut-off to conduit 185 and sent through conduit 186 to move the piston rod, as previously described. In this manner, working double acting air cylinder 183 moves movable frames 78 and 79 in a direction transverse to the reciprocating direction of chutes 74.

Valve operating members 83, 83A open control valves 181, 182, respectively, from normally closed position, only when control valves are actually engaged, respectively, by fingers 82, 81.

Reference is now made to FIGS. 1, 4, 7, 8 and 14. As previously described with reference to FIG. 9, a source of air supply is provided at entrance 175 of air conduit 176. Shut-off valve 177 and regulator valve 178 are located in conduit 176. The air pressure at the entrance side of regulator valve 78 is higher than the air pressure emitted from pressure regulating valve 178.

A normally closed control valve 200 and a four way spring return valve 201 are provided for tamping mechanism A. A rocker arm 203 fastened to shaft 76 is provided with a cam face 202 which actuates valve operating member 204 on control valve 200.

Conduit 205 branches off conduit 176 and connects to normally closed control valve 200. Conduit 205A connects control vlave 200 with four way spring return valve 201 which is also provided with exhaust ports at 206 and 207. A conduit 210 connects pressure regulating valve 178 with four way spring return valve 201. Conduit 146 connects one side of two way air cylinder 140 with four way spring return valve 201. Conduit 147 connects the opposite side of two way air cylinder 140 with valve 201.

In operation, air shut-off valve 177 allows high pressure air to pass through conduits 176 and 205 to normally closed control valve 200. Oscillating shaft 76 rocks cam surface 202 back and forth across valve operating member 204 to open and close value 204. When open air passes through valve 204, to and through conduit 205A to four way spring return valve 201. The air opens the valve against the tension of the valve spring. When control valve 200 is closed the spring exhausts the air through port 207 and thereby moves the piston head or spool to air shut-off position in valve 201. In air open position, the spool allows low pressure air from conduit 210 to alternatively permit air to pass through conduits 146 and 147 to move the piston in two way air cylinder 140 up and down to reciprocate tamping base 143.

In like manner tamping mechanism B, C and D are operated.

While the mode of operation of the above described apparatus is believed to be obvious from the illustration of the drawings and description set forth, it is briefly outlined as follows:

A desired number of boxes having open tops are placed on the floor 51 of platform P with the longitudinal dimension of the boxes crosswise of the platform. There will be a thread guide or chute 74 for each box and the thread guide or chute 74 will oscillate longitudinally and reciprocate laterally in accordance with oscillating shaft 76 and double acting air cylinder 183 actuating reciprocating carriage 3. In this manner, the tape is layed in the box with the next above layer of tape advanced away from a parallel position above the adjacent lower layer of tape. The tape is therefore layed in criss-cross fashion in the box.

The lateral reciprocation of the reciprocating carriage 3 carrying rod 73 will through actuating arms 72, 72A reciprocate rack 71. The rack 71 engages to rotate the pinion 70 in two directions. The overriding clutch 2C is free to rotate in a non-working cycle in one direction and in a working cycle in the opposite direction when the sprags grip the relative rotating parts so at to rotate shaft sections 66, 64, and 60. Shaft section 60 rotates worm wheel 58 and thereby stub shaft 55. Stub shaft 55 rotates the relative rotating parts of overriding clutch C which has the sprags engaging the relative rotating parts to place the overriding clutch in operative drive condition. Sprocket 56 of clutch C drives chain 57 and sprocket 31 which drives drive shaft 25 to thereby lower platform P in an indexing or incremental motion.

When the platform P is in lowermost position it is manually lifted upward to starting position. This movement is accomplished when drive shaft 25, rotating in an opposite direction from indexing rotation direction, rotates sprockets 31, 56 and chain 57 rotates overriding clutch C in a non-working cycle so that stub shaft 55 is uneffected by the rotation of sprocket 56.

The self locking feature inherent in worm 59 and worm wheel 58 type drive, holds platform P in initial starting position. The rack 71 and pinion 70 index platform P downwardly.

The oscillating motion of the thread guide or chute 74 will cause the tape to fold upon itself at each end of the oscillating stroke to form a loop in the tape.

There are types of material or conditions in drawing the tape out of the container, wherein the loops are undesirable. Tamping mechanisms A, B, C, D are provided to eliminate this undesirable condition.

Figure 7:
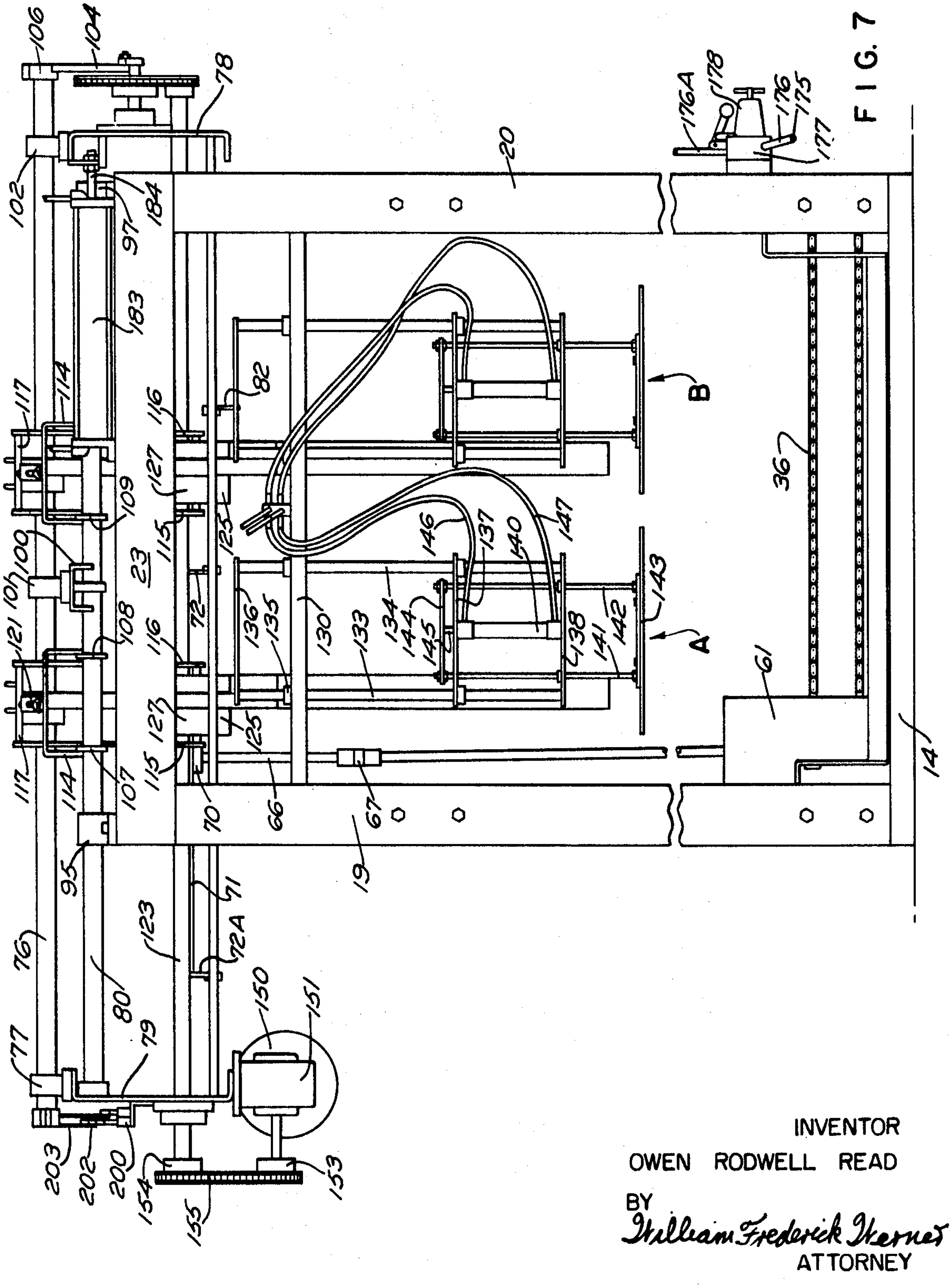
FIG. 7 is a front elevational view.

In practice two tamping mechanisms, such as A and C seen in FIGS. 6 and 7 will be in operative position above the box or container placed upon floor 51 of platform P, at opposite ends of the oscillating stroke of thread guide 74.

Figure 14:
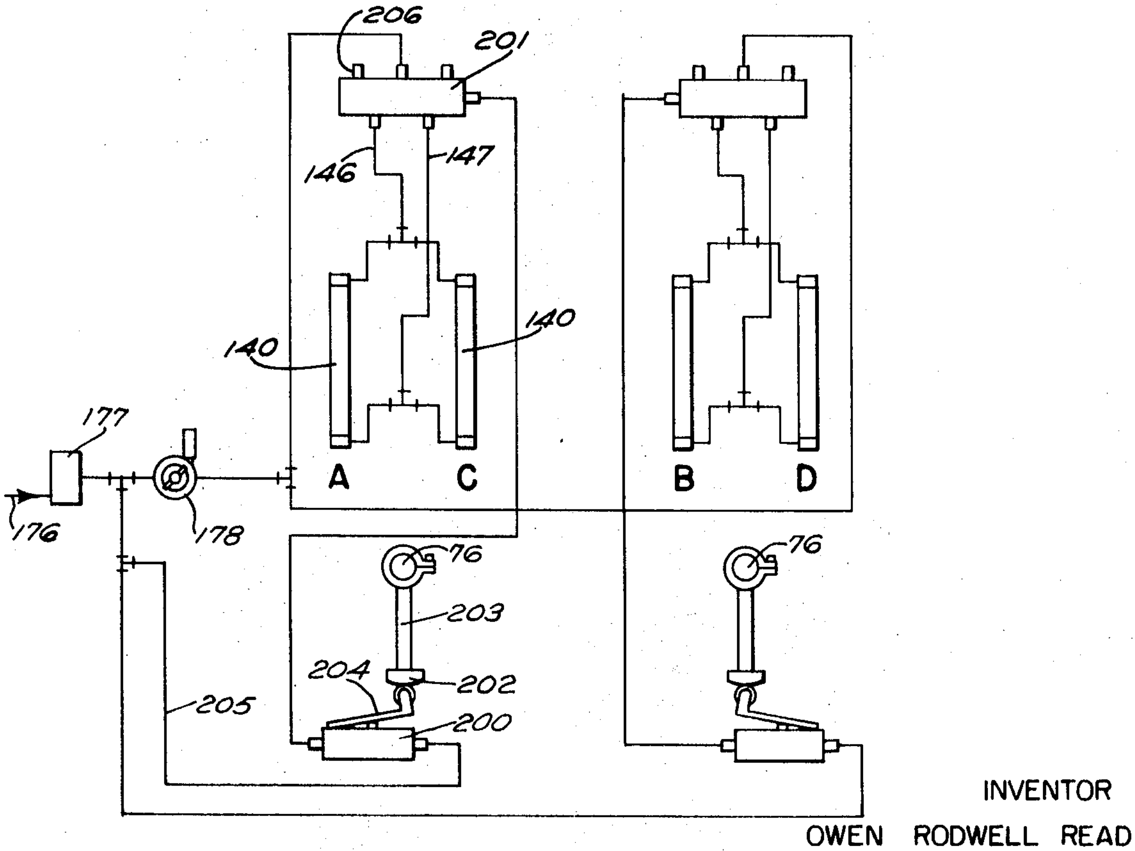
FIG. 14 is a diagrammatic view of the pneumatic mechanism controlling the lamping mechanism.

A description of the construction and operation of tamping mechanism A has been stated. FIG. 14 illustrates the operation of tamping mechanisms C, B and D.

Having shown and described a preferred embodiment of the present invention, by way of example, it should be realized that structural changes could be made and other examples given without departing from either the spirit or scope of this invention.

What I claim is:

1. A tape loading apparatus consisting of a framework, a reciprocating carriage consisting of a main drive shaft, an oscillating shaft provided with tape guide means, means for rotating said main drive shaft, and a second means for oscillating said oscillating shaft to oscillate said tape guide means, a third means slidingly mounting said reciprocating carriage for lateral movement in said framework, a fourth means for moving said movable frame in transverse movement, a platform, a fifth means mounting said platform for up and down movement in said framework, and a sixth means operatively connecting said reciprocating carriage with said platform, whereby, lateral movement of said reciprocating carriage moves said platform downward in incremental movement.

2. The apparatus of claim 1 in which said fourth means attached to said framework and having a piston rod fastened on one end to said movable frame consists of a working air cylinder, a four way double actuator valve, a first normally closed control valve provided with a first valve operating member, a second normally closed control valve provided with a second valve operating member, all fastened in said framework, and a rod, provided with a first finger and a second finger fastened in said reciprocating carriage, whereby, initial movement of said reciprocating carriage engages a finger with a valve operating member to initiate alternate engagement of said first finger with said first valve operating member and said second finger with said second valve operating member to reciprocate said reciprocating carriage in transverse movement through said four way double actuator valve control over the reciprocation of said working air cylinder and piston rod.

3. The apparatus of claim 1 in which said tape guide means consists of a hollow tapered chute having a wide open end and a narrow spout end, a two part block fastened to said oscillating shaft and a bracket fastened on one end to said chute and on the other end to said two part block.

4. The apparatus of claim 1 in which said second means for oscillating said oscillating shaft consisting of a crank sprocket wheel rotatively fastened to said reciprocating carriage, a link provided with an elongated slot fastened to said oscillating shaft, a crank arm pivotally connected to said crank sprocket wheel and slidably connected to said link at said elongated slot, a drive sprocket fastened to said main drive shaft, and chain means operatively connecting said drive sprocket with said crank sprocket wheel.

5. The apparatus of claim 1 in which said sixth means consists of a rack slidably held in said reciprocating carriage, a pinion, a shaft supported in said framework, an overriding clutch connecting said pinion in operative engagement with said rack, a stub shaft, a worm and worm wheel drive operatively connecting said shaft with said stub shaft, a platform, a seventh means supporting said platform, for up and down movement, in said framework, said seventh means including a drive shaft rotatively supported in said framework, a second overriding clutch, attached to said stub shaft, and drive means operatively connecting said overriding clutch with said drive shaft, said worm and worm wheel supporting said platform in raised position, a rod, provided with spaced apart actuator arms located on opposite sides of said rack, fastened to said reciprocating carriage, whereby reciprocating movement of said reciprocating carriage alternately engages said two actuator arms with opposite sides of said rack to rotate said pinion in one direction, to lower said platform with an incremental movement, through rotation of said shaft, worm and worm wheel, stub shaft, second overriding clutch and drive shafts said second overriding clutch permitting manual movement of said platform from a lower to a raised position.

6. The apparatus of claim 1 to which a tamping mechanism is provided consisting of a tamping frame fastened to said framework, a tamper, an eighth means slidingly mounting said tamper in said tamping frame, a two way air cylinder provided with a reciprocating piston rod, a ninth means fastening said two way air cylinder to said tamping frame with said piston rod operatively connected to said tamper, a tenth means for actuating said tamper in sliding up and down movement in said tamping frame including a normally closed control valve provided with a valve operating member, and a four way spring return valve, a rocker arm provided with a cam surface, means fastening said rocker arm to said oscillating shaft, whereby said oscillating shaft thru said cam surface alternately opens and closes said control valve to actuate said piston rod in said air cylinder through said four way spring return valve to move said tamper up and down in timed relation to the oscillating movement of said tape guide and in timed relation to the reciprocating movement of said reciprocating carriage and incremental movement of said platform.

7. The apparatus of claim 1 in which said main drive shaft is provided with a feed roller above said tape guide means, a bracket, having a cap, fastened to said reciprocating carriage, a second bracket, having a cross bar provided with guide fingers, fastened to said reciprocating carriage, and a pressure roll bracket, provided with a cross rod and roll shaft, pivotally mounted to said reciprocating carriage, a tension rod fastened on one end to said cross rod and slidingly mounted in said cap, a wing nut rotatively secured to said cross rod, a coil spring interposed between said wing nut and cap, a pressure roll rotatively mounted on said roll shaft, whereby said coil spring yieldingly urges said pressure roll against said feed roll.

References Cited

UNITED STATES PATENTS

| | | | |
|---|---|---|---|
| 3,351,992 | 11/1967 | Carter | 28—21X |
| 3,487,421 | 12/1969 | Ruppel et al. | 53—116X |

TRAVIS S. McGEHEE, Primary Examiner

U.S. Cl. X.R.

19—160; 28—21; 53—124B